US012646003B1

(12) United States Patent
Kapetanakis et al.

(10) Patent No.: US 12,646,003 B1
(45) Date of Patent: Jun. 2, 2026

(54) REAL-TIME DRIFT DETECTION IN TIME-SERIES DATA FOR AUTOMATED AI MODEL RE-TRAINING

(71) Applicant: Distributed Analytics Solutions, Ltd., London (GB)

(72) Inventors: Stylianos Kapetanakis, London (GB); Khuong An Nguyen, London (GB); Zhiyuan Luo, London (GB)

(73) Assignee: DISTRIBUTED ANALYTICS SOLUTIONS, LTD., London (GB)

( * ) Notice: Subject to any disclaimer, the term of this patent is extended or adjusted under 35 U.S.C. 154(b) by 0 days.

(21) Appl. No.: 19/289,778

(22) Filed: Aug. 4, 2025

(51) Int. Cl.
*G06N 20/00* (2019.01)

(52) U.S. Cl.
CPC ................................... *G06N 20/00* (2019.01)

(58) Field of Classification Search
CPC ...................................................... G06N 20/00
See application file for complete search history.

(56) References Cited

U.S. PATENT DOCUMENTS

| | | | |
|---|---|---|---|
| 2007/0179746 A1* | 8/2007 | Jiang | G06F 11/008 702/185 |
| 2019/0370610 A1* | 12/2019 | Batoukov | G06F 11/0709 |
| 2021/0287515 A1* | 9/2021 | Min | G21D 3/06 |
| 2024/0013095 A1* | 1/2024 | Stein | G06N 3/0495 |
| 2024/0345550 A1* | 10/2024 | Jain | G05B 13/027 |
| 2024/0370768 A1* | 11/2024 | Huang | G06N 20/00 |

FOREIGN PATENT DOCUMENTS

| | | |
|---|---|---|
| CN | 119066376 A | 12/2024 |
| CN | 118885983 B | 2/2025 |

OTHER PUBLICATIONS

Prinster et al. ("WATCH: Weighted Adaptive Testing for Changepoint Hypotheses via Weighted-Conformal Martingales", Proceedings of the 41st International Conference on Machine Learning, Vancouver, Canada. PMLR 267, May 7, 2025) (Year: 2025).*
Bifet et al. ("Learning from Time-Changing Data with Adaptive Windowing", Proceedings of the 2007 SIAM International Conference on Data Mining) (Year: 2007).*
Ruf* et al. ("A composite generalization of Ville's martingale theorem using e-processes", May 3, 2023, ) (Year: 2023).*
Doob, J. L. (1971). What is a Martingale?. The American Mathematical Monthly, 78(5), 451-463.
Vovk, V., Nouretdinov, I., & Gammerman, A. (2003). Testing exchangeability on-line. In Proceedings of the 20th international conference on machine learning (ICML-03) (pp. 768-775).

* cited by examiner

*Primary Examiner* — Imad Kassim
(74) *Attorney, Agent, or Firm* — Sterne, Kessler, Goldstein & Fox P.L.L.C.

(57) ABSTRACT

Aspects disclosed provide system and method for monitoring a trained artificial intelligence (AI) model to determine when the AI model needs to be re-trained. The system and method provides a framework for detecting when the model's ability to provide accurate predictions for real-time time-series data have trended/drifted away from data used to train the AI model. Based on detecting the trend/drift, the system and method will generate an alert indicating at the AI model may need to be re-trained.

20 Claims, 4 Drawing Sheets

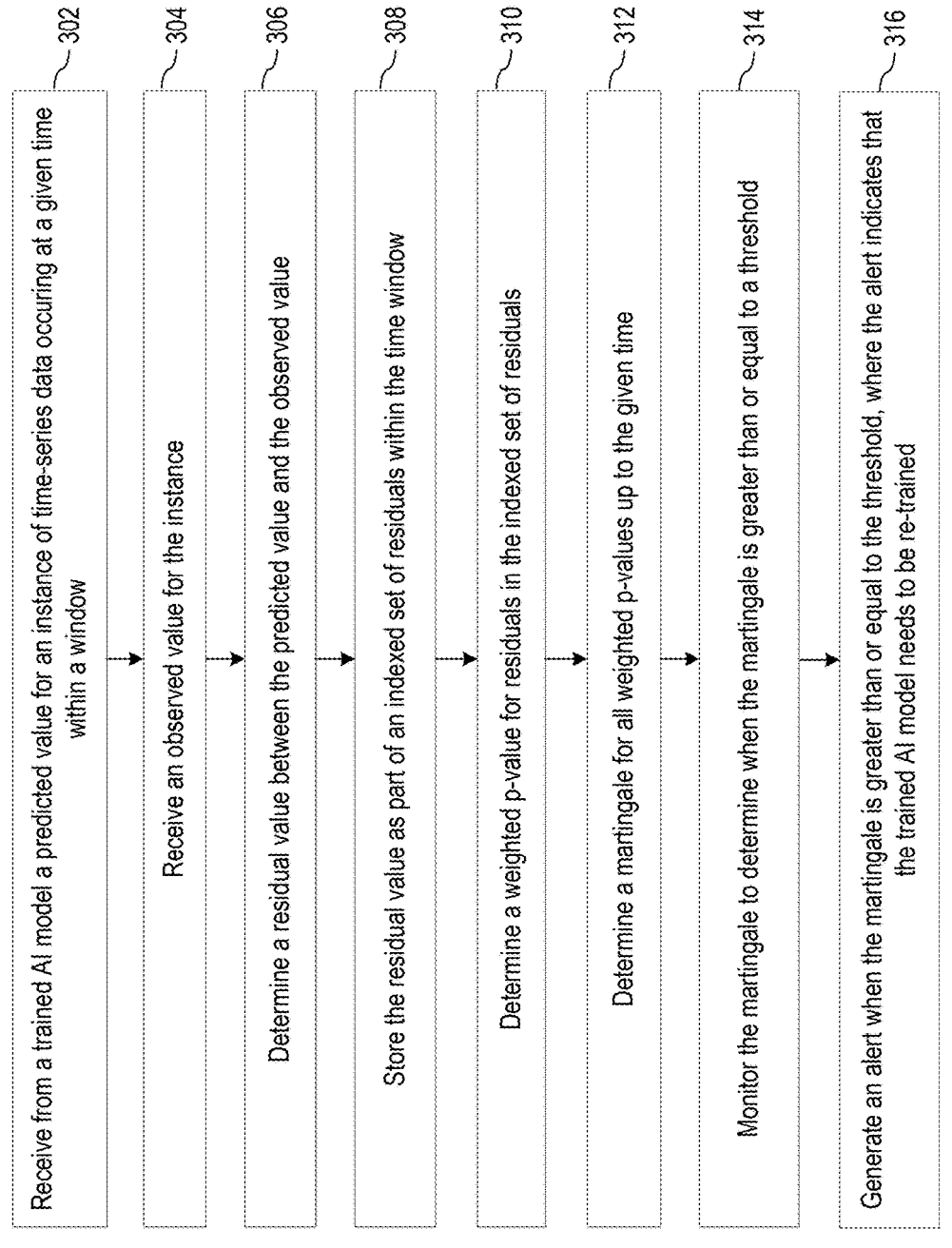

300

Receive from a trained AI model a predicted value for an instance of time-series data occuring at a given time within a window ~ 302

Receive an observed value for the instance ~ 304

Determine a residual value between the predicted value and the observed value ~ 306

Store the residual value as part of an indexed set of residuals within the time window ~ 308

Determine a weighted p-value for residuals in the indexed set of residuals ~ 310

Determine a martingale for all weighted p-values up to the given time ~ 312

Monitor the martingale to determine when the martingale is greater than or equal to a threshold ~ 314

Generate an alert when the martingale is greater than or equal to the threshold, where the alert indicates that the trained AI model needs to be re-trained ~ 316

Control Unit 402

Control Interface 404

Storage Unit 406

Storage Interface 408

Software 410

User Interface 412

Display Interface 414

Communication Unit 416

Communication Interface 418

Remote device(s), network(s), entity(ies) 420

Network 106

Communication Infrastructure 422

REAL-TIME DRIFT DETECTION IN TIME-SERIES DATA FOR AUTOMATED AI MODEL RE-TRAINING

TECHNICAL FIELD

Aspects relate to frameworks for re-training artificial intelligence (AI) models.

BACKGROUND

Artificial intelligence (AI) models are powerful tools for predicting outcomes of real-world events. For example, AI models can be trained on historic data sets to provide predictions about future events. Such events can be, for example, future weather patterns, future stock prices, predictions on future health conditions, etc. However, predictions provided by AI models assume that future patterns will follow the same historic trends. In other words, trained AI models are only as good as the training data they are trained on. Thus, AI models will only make predictions within the boundaries of their training data.

AI models, however, fail when real-world data trends/drifts away from the patterns of the training data. For example, if weather patterns start to trend/drift away significantly from historic patterns of the training data due to events like climate change, AI models, despite being well trained, will start to give inaccurate results when predicting future weather patterns.

In order for the AI models to maintain their ability to make accurate predictions, the AI models must account for, and be re-trained to account for, new trends. However, a problem remains as to how to detect when AI models need to be re-trained. Knowing when to re-train an AI model is critical because the amount of data used to train AI models and the scale of modern AI models is huge. It is not practical to constantly re-train AI models because re-training a modern AI model is both costly and time-consuming. Thus, as AI models become more complex and require more data, the cost and time to train and re-train AI models will increase exponentially.

Solutions are needed to address this problem.

SUMMARY

Aspects disclosed herein provide a system and method for monitoring a trained artificial intelligence (AI) model, to determine when the AI model needs to be re-trained. The system and method provides a framework for detecting when the model's ability to provide accurate predictions have trended/drifted away from real-world data. Based on detecting the trend/drift away from real-world data, the system and method will generate an alert. In aspects, the alert can alert a system administrator, data scientist, or other individual or computing system responsible for training the AI model that the AI model may need to be re-trained. Thus, the disclosed system and method provided is a monitoring tool to be integrated with an AI model, to track the quality and accuracy of results provided by the AI model.

In aspects, the system and method can be implemented using one or more computing devices to perform the aforementioned functionality. In aspects, and for an instance of time-series data occurring at a given time t within a rolling time window W, the system can receive, from a trained AI model, a predicted value $\hat{x}_t$ for the instance. In aspects, the system can further receive an observed value $x_t$ for the instance. Once $\hat{x}_t$ and $x_t$ are received, in aspects, the system can determine a residual value $r_t$ between $\hat{x}_t$ and $x_t$. In aspects, the system can then store $r_t$ as part of an indexed set of residuals $I_t$ within W.

In aspects, for all the residuals within $I_t$, the system can determine a weighted p-value $p_t$. The weighted p-value is the probability of observing data as extreme or more extreme than what was actually observed, assuming the null hypothesis is true. How $p_t$ is determined will be described later in this disclosure.

In aspects, and once $p_t$ is determined, the system can then determine a martingale $S_t$ for all weighted p-values up to $p_t$. A martingale refers to a special type of stochastic process that models a fair game over time. $I_t$ is used in probability theory and statistics, particularly in modeling sequences where the future expectation is equal to the present, given the past. How $S_t$ is determined will be described later in this disclosure.

In aspects, once $S_t$ is determined, the system can monitor $S_t$ to determine when $S_t$ is greater than or equal to a threshold $\tau$. In aspects, when $S_t$ is greater than or equal to $\tau$, the system can generate an alert that can indicate that the trained AI model may need to be re-trained.

In aspects, the alert can take the form of a visual alert to be displayed on a graphical user interface (GUI) to a user, or can take the form of a message sent as part of a messaging system to the user. The user can be, for example, a system administrator, data scientist, or other individual responsible for training the AI model. In other aspects, rather than sending the alert to a user, the alert can be sent as a signal to a further computing system responsible for training the AI model to automatically initiate re-training of the AI model.

A person of ordinary skill in the art (POSA) reading this disclosure can determine how best to implement the alert and what actions are to be taken based on the specific application and AI model to be monitored.

Certain aspects have other steps or elements in addition to or in place of those mentioned above. The steps or elements will become apparent to a POSA from a reading of the following detailed description when taken with reference to the accompanying drawings.

BRIEF DESCRIPTION OF THE DRAWINGS

The accompanying drawings, which are incorporated herein and form a part of the specification, illustrate aspects of the present disclosure and, together with the description, further serve to explain the principles of the disclosure and to enable a POSA to make and use the aspects.

FIG. 3 is an example method of operating the system according to aspects.

DETAILED DESCRIPTION

Figure 1:
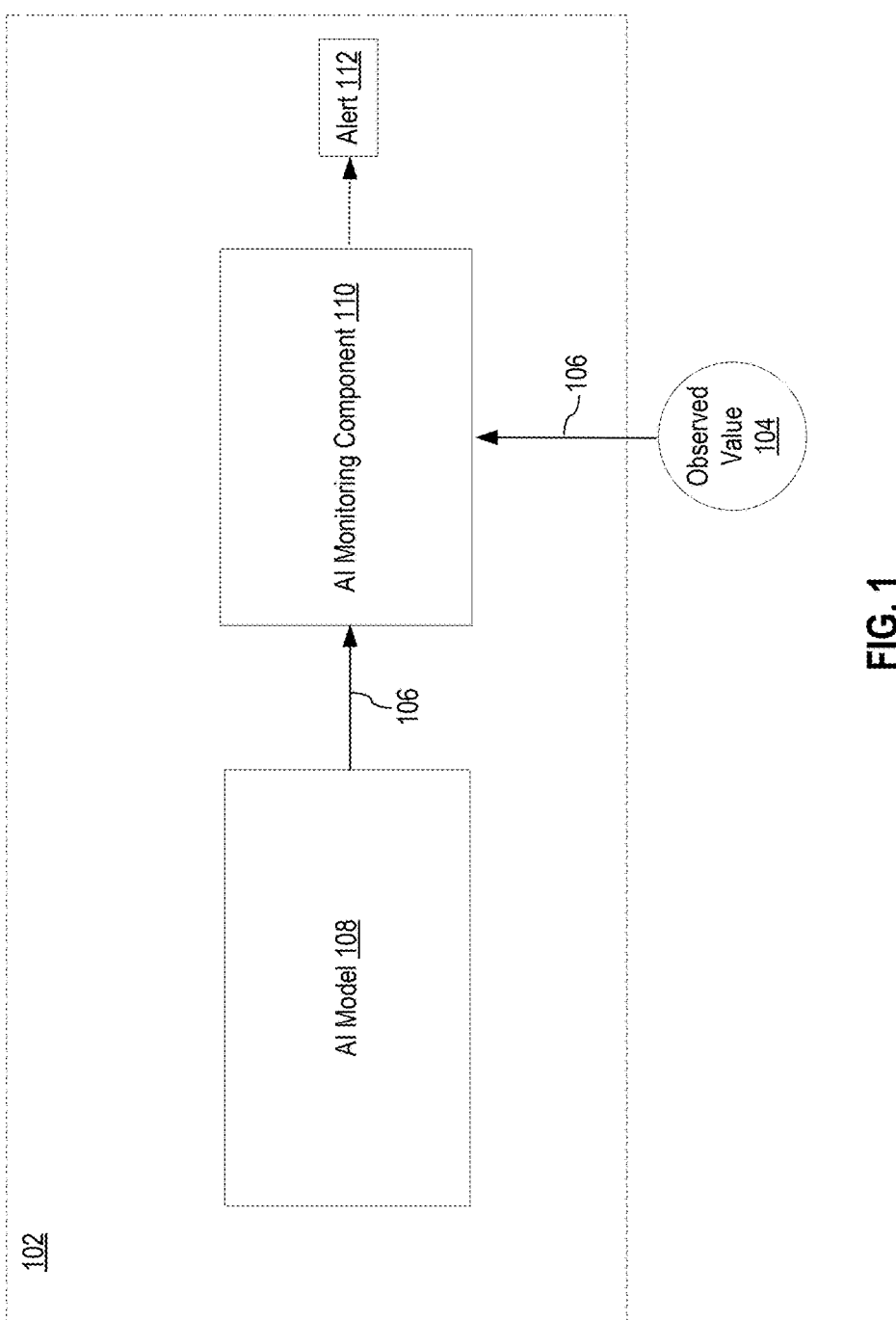
FIG. 1 is an example system for monitoring a status of a trained artificial intelligence (AI) model to determine when it may need to be re-trained according to aspects.

Aspects disclosed herein provide a system and method for monitoring a trained artificial intelligence (AI) model to determine when the AI model needs to be re-trained. The system and method provides a novel framework to detect when the real-world data has trended/drifted away from the original training data in order to alert a system administrator, data scientist, or other individual or computing system responsible for training the AI model, that the AI model may need to be re-trained.

The system and method operates under certain assumptions. First, the system and method works in an online setting. This means that the system and method works on data sets that arrive in real-time, one-by-one, and in a continuous manner. This data can include, for example, weather data, stock market prices, streaming data (e.g., data coming in from sensors, such as temperature sensors, healthcare vitals monitoring devices, etc.), or event-driven data (e.g., website clicks/page views, user session events, etc.). A POSA reading this disclosure will recognize the applications for the disclosed system and method based on the aforementioned data and similar contexts.

The objective of the system and method is to identify the right moment to generate an alert to re-train the AI model based on recognizing that a drift/trend has occurred away from the original training data. This is a more challenging setting than the offline setting, when entire data sets are given in advance and it is easier to detect anomalies and trends away from normal patterns in historic data, due to the full data set being known in advance. In the online setting, it must be determined at what point the data has shifted away from normal trends without the knowledge of the full data set.

Second, the system and method works on time-series data. Again, time-series data provides for a more challenging setting because each data sample is time-stamped and cannot be shuffled. For example, time-series data cannot be shifted. Any shifting of the data violates the time constraints. Thus, time-series data is not exchangeable, and this is a big challenge for many AI models because AI models must learn patterns for time-series data over time, which can be complex and long-term. Time-series data also often changes its statistical properties over time, and most traditional AI models are not equipped to handle or detect such changes. Most traditional models assume stationarity, which does not hold true in real-world scenarios. For example, simple models like decision trees or support vector machines (SVMs) do not natively handle sequence data.

Thus, the system and method provides an enhancement to existing systems employing AI models, because it provides a reliability mechanism to such systems. The system and method does this by providing a way to monitor the AI models to determine whether these models need to be re-trained given new trends in the real-world data. No such system is known to exist that provides the disclosed functions. Thus, the system and method provided herein use entirely new ways of solving the problem of model re-training, which improves the functioning of computers and the field of AI.

The following aspects are described in sufficient detail to enable those skilled in the art to make and use the disclosure. It is to be understood that other aspects are evident based on the present disclosure, and that system, process, or mechanical changes can be made without departing from the scope of aspects of the present disclosure.

In the following description, numerous specific details are given to provide a thorough understanding of the disclosure. However, it will be apparent that the disclosure can be practiced without these specific details. In order to avoid obscuring an aspect of the present disclosure, some well-known circuits, system configurations, architectures, and process steps are not disclosed in detail.

The drawings showing aspects of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the disclosure can be operated in any orientation.

The term "unit" referred to herein may include software, hardware, or a combination thereof in an aspect of the present disclosure in accordance with the context in which the term is used. For example, the software can be machine code, firmware, embedded code, or application software. Also, for example, the hardware can be circuitry, a processor, a special purpose computer, an integrated circuit, integrated circuit cores, or a combination thereof. Further, if a unit is written in the system or apparatus claims section below, the unit is deemed to include hardware circuitry for the purposes and the scope of the system or apparatus claims.

The units in the following description of the aspects can be coupled to one another as described or as shown. The coupling can be direct or indirect, without or with intervening items between coupled units. The coupling can be by physical contact or by communication between units.

System Overview and Function

FIG. 1 is an example system 100 for monitoring a status of a trained artificial intelligence (AI) model 108 to determine when the AI model 108 may need to be re-trained according to aspects. The AI model 108 can be any model, such as a large language model (LLM), agentic AI component, or other AI component implementing one or more AI models that are trained and capable of making predictions for real-world data. For example, the predictions can be about weather data, stock market prices, streaming data (e.g., data coming in from sensors, such as temperature sensors, healthcare vitals monitoring devices, etc.), or event-driven data (website clicks/page views, user session events, etc.).

In aspects, the system 100 can be implemented on one or more computing devices, including server infrastructure of a company, a cloud service provider, or other similar entity. For example, the system 100 can be housed in a cloud-computing environment 102. The cloud-computing environment 102 can include server infrastructure. The cloud-computing environment 102 can be a public or private cloud service. A private cloud refers to a cloud environment similar to a public cloud with the exception that it is operated solely for a single organization.

In aspects, the cloud-computing environment 102 can comprise a variety of centralized or decentralized computing devices. For example, the cloud-computing environment 102 may include a mobile device, a laptop computer, a desktop computer, grid-computing resources, a virtualized computing resource, cloud-computing resources, peer-to-peer distributed computing devices, a server, a server farm, or a combination thereof. The cloud-computing environment 102 can be centralized in a single room, distributed across different rooms, distributed across different geographic locations, or embedded within a network 106.

In aspects, and as shown in FIG. 1, the computing devices of the cloud-computing environment 102 may have software components stored thereon to enable the functions of the system 100. In aspects, one of these components can be an AI monitoring component 110. In aspects, the AI monitoring component 110 can perform the core functions to enable the system 100 to function, and will be discussed in detail below.

The network 106 refers to a telecommunications network, such as a wired or wireless network. The network 106 can span and represent a variety of networks and network topologies. For example, the network 106 can include wireless communication, wired communication, optical communication, ultrasonic communication, or a combination thereof. For example, satellite communication, cellular communication, Bluetooth, Near Field Communications (NFC), Infrared Data Association standard (IrDA), wireless fidelity (WiFi), and worldwide interoperability for microwave access (WiMAX) are examples of wireless communication that can be included in the network 106. Cable, Ethernet, digital subscriber line (DSL), fiber optic lines, fiber to the home (FTTH), and plain old telephone service (POTS) are examples of wired communication that can be included in the network 106. Further, the network 106 can traverse a number of topologies and distances. For example, the network 106 can include a direct connection, personal area network (PAN), local area network (LAN), metropolitan area network (MAN), wide area network (WAN), or a combination thereof.

In aspects, and as shown in FIG. 1, in order to perform its function of monitoring the AI model 108 to determine when the AI model 108 needs to be re-trained, the system 100 needs to compare predicted values generated by the AI model 108 to observed values (e.g., observed value 104) for the real-world data, to determine at what point the two sufficiently trend/drift away from one another such that the system 100 needs to generate an alert 112 indicating that the AI model 108 may need to be re-trained. In aspects, the comparison can be done by the AI monitoring component 110.

In aspects, the alert 112 can take the form of a visual alert to be displayed on a graphical user interface (GUI) to a user, or can take the form of a message sent as part of a messaging system to the user. In aspects, the user can be, for example, the system administrator, data scientist, or other individual responsible for training the AI model 108. In other aspects, rather than sending the alert 112 to a user, the alert 112 can be sent as a signal to a further downstream system responsible for training the AI model 108 to automatically initiate re-training of the AI model 108.

Figure 2:
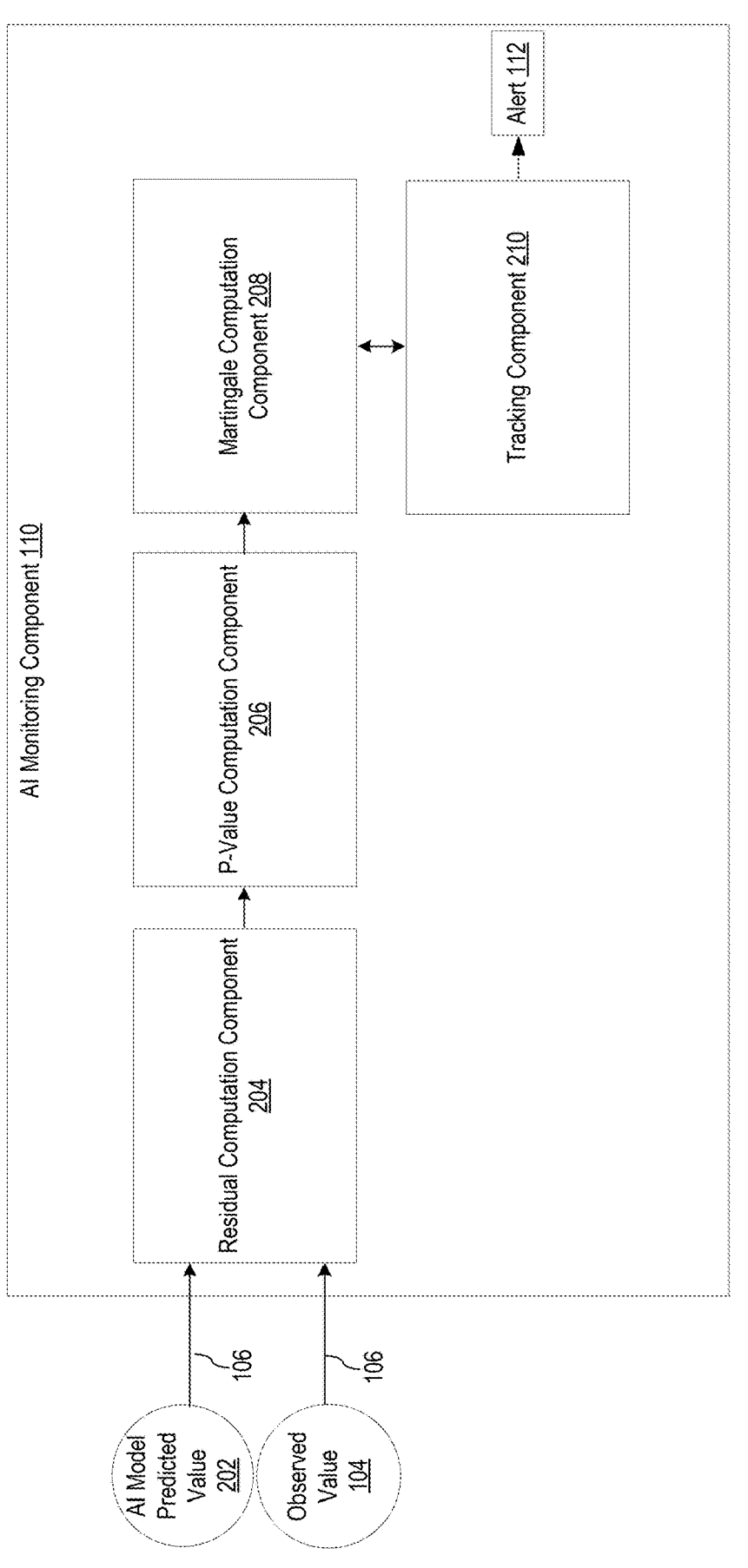
FIG. 2 is an example implementation of an AI monitoring component of the system according to aspects.

FIG. 2 is an example implementation of the AI monitoring component 110 of the system 100 according to aspects. How the AI monitoring component 110 functions will now be described in detail. In aspects, the AI monitoring component 110 can be implemented using software and/or hardware.

In aspects, and assuming that the AI model 108 of FIG. 1 is used to make predictions for real-world data, the AI monitoring component 110 can receive, from the AI model 108, a predicted value 202 for an instance of the real-world data occurring at a given time within a rolling time window. Throughout this disclosure the predicted value 202 will also be referred to using symbol $\hat{x}_t$ for ease of reference. Also, throughout this disclosure the given time will be referred to as t, and the rolling time window will be referred to as W, also for ease of reference.

In aspects, W can be any window of time, for example, minutes, days, weeks, etc., in which instances of the real-world data occur at the given times. W refers to a fixed-duration time window that moves forward in time, capturing only the most recent data within that window.

In aspects, given that the observed value 104 for the instance of the real-world data can be measured and/or observed, the AI monitoring component 110 can also receive the observed value 104 of the instance. The observed value 104 is also needed to determine whether the predicted value 202 is trending/drifting away from the real-world data. Throughout this disclosure the observed value 104 will also be referred to using symbol $x_t$ for ease of reference.

In aspects, once both the predicted value 202 and the observed value 104 are received by the AI monitoring component 110, both can be transmitted to a further sub-component of the AI monitoring component 110 to determine a residual value between the two. The residual value refers to a difference in value between the predicted value 202 and the observed value 104. Throughout this disclosure, the residual value will also be referred to using symbol $r_t$ for ease of reference.

In aspects, the sub-component of the AI monitoring component 110 that can determine the residual value can be a residual computation component 204. The residual computation component 204 refers to a software and/or hardware component that can implement functionality to determine a residual value between the predicted value 202 and the observed value 104. In aspects, the residual computation component 204 can implement the function shown in equation (1) below, or its equivalent, to determine the residual value:

$$r_t = |x_t - \hat{x}_t| \tag{1}$$

In equation (1) the residual value, represented as $r_t$, can give a first indication of whether the predicted value 202 fits well with the training data. For example, if $r_t$ is small, it can mean that the predicted value 202 fits well with the training data because it does not differ much from the observed value 104. If, however, $r_t$ is large, it can mean that the predicted value 202 does not fit well with the training data because it differs by a significant amount from the observed value 104.

In aspects, once the residual value is determined, the residual value can be stored as part of an indexed set of residuals occurring within the rolling time window. Throughout this disclosure the indexed set of residuals will also be referred to using symbol $I_t$ for ease of reference. In aspects, the indexed set of residuals can be implemented as an array or vector of values representing the residual values determined within the rolling time window. In aspects, the indexed set of residuals can be represented as equation (2) shown below, or its equivalent:

$$I_t = \{i : \max(1, t - W) \le i \le t - 1\} \tag{2}$$

In equation (2), i is an index value for each residual value in the indexed set of residuals, t represents the given time, and W represents the rolling time window. Equation (2) defines the indexed set of residuals in which i starts from $\max(1, t-W)$ and goes up to $t-1$. As an example, suppose the given time is t=10 and the rolling time window is W=5, then for $I_{10} = \{i : \max(1, 10-5 \le i \le 9)\} = \{i : 5 \le i \le 9\} = \{5, 6, 7, 8, 9\}$. In other words, at the given time t=10 for the time window W=5, the indexed set of residuals consists of all residual values for index values $\{5, 6, 7, 8, 9\}$.

In aspects, in order to put all the residual values of the indexed set of residuals on a common scale, the AI monitoring component 110 can determine a weighted p-value for residuals in the indexed set of residuals. In other words, the AI monitoring component 110 will compute a weighted p-value by comparing all residuals observed so far within the indexed set of residuals. Throughout this disclosure the weighted p-value will also be referred to as $p_t$ for ease of reference.

In aspects, a further sub-component of the AI monitoring component 110 can be used to determine the weighted p-value. In aspects, and as shown in FIG. 2, this further sub-component can be the p-value computation component 206. The p-value computation component 206 refers to a software and/or hardware component that can implement functionality to determine the weighted p-value. Thus, once the indexed set of residuals is obtained, it can be passed, along with control, to the p-value computation component 206 for further processing.

In aspects, the p-value computation component 206 can implement the function shown in equation (3) below, or its equivalent, to determine the weighted p-value:

$$p_t = \frac{1}{Z_t} \sum_{i \in I_t} W_{t,i} * 1\{r_i \geq r_t\} \qquad (3)$$

In equation (3), $Z_t$ is a normalization constant; i is the index value for each residual value in the indexed set of residuals; $w_{t,i}$ is a weight assigned to each residual value corresponding to i at t; $r_i$ is a residual value corresponding to i; and $1\{r_i \geq r_t\}$ is an indicator function that equals 1 if $r_i \geq r_t$, and 0 otherwise.

As indicated, because the system 100 operates on time-series data, which is not directly exchangeable, the rolling time window is used to consider only the most recent residuals, as represented in the indexed set of residuals to compute the weighted p-value. This resolves issues related to exchangeability. This ability to perform exchangeability of the data without affecting any statistical properties (i.e., the trend, mean variance, auto-correlation, etc.) is central to the processes described in this disclosure. This is because changes in the data's statistical properties do not present themselves within W. Thus, the data can be shuffled within W without affecting the statistical properties, allowing for the calculations described herein to be performed to reliably make inferences on the data.

In aspects, $w_{t,i}$ is assigned so that older data samples have less influence on the weighted p-value. Thus, the most recent data samples will have more influence on the outcome than past results. This is also desirable because older data samples are often less relevant and outdated. By giving the most recent samples higher weights, the procedure focuses on the new trends and adjusts quickly when data drifts. Thus, older data samples have their influence dampened.

In aspects, $w_{t,i}$ can be assigned according to equation (4) below, or its equivalent:

$$w_{t,i} = \lambda^{t-1-i} \qquad (4)$$

In equation (4), $\lambda$ is a constant between 0 and 1; and i and t represent the same values as in equation (3). In aspects, $\lambda$ can be chosen based on the application and the AI model 108 to be monitored.

In aspects, $Z_t$ in equation (3) can be obtained by summing all the weights for the indexed set of residuals. In aspects, and for example, equation (5) below, or its equivalent, shows how $Z_t$ can be determined:

$$Z_t = \sum_{i \in I_t} w_{t,i} \qquad (5)$$

In equation (5), $w_{t,i}$ is a weight assigned to each residual value corresponding to i at t; and $I_t$ is the indexed set of residuals.

By way of example, and doing a sample computation, in order to determine a weighted p-value, at a given time t=5, for a rolling time window W=3, the indexed set of residuals $I_t$ is {2, 3, 4}. Assuming that the residual values (which are chosen at random in this example) corresponding to the indexed set of residuals are $\{r_2, r_3, r_4\}=\{0.75,0.60,0.90\}$ and $r_5=0.80$. Also assume and the weights assigned to each residual value corresponding to i at t (again chosen at random in this example) are $\{w_{5,2}, w_{5,3}, w_{5,4}\}=\{0.2, 0.3, 0.5\}$. The result of the weighted p-value according to equation (3), is $p_5=0.5$. This is due to the indicator values being: $1\{r_2 \geq r_5\}=0$; $1\{r_3 \geq r_5\}=0$; $1\{r_4 \geq r_5\}=1$. The weighted sum is: $(0.2)(0)+(0.3)(0)+(0.5)(1)=0.5$. The normalization constant is: $0.2+0.3+0.5=1.0$. Thus, the weighted p-value is $(0.5)/(1.0)=0.5$.

The weighted p-value can give a second indication of whether the predicted value 202 fits well with the training data. This is because the weighted p-value is an indication of how "extreme" the newer residuals are compared to past residuals. For example, if the value of $p_t$ is close to 1, it can mean that the predicted value 202 fits well with the training data because a large fraction of past residuals exceeds the new residuals. Thus, the new data samples behave similarly to the past data, which implies there is no data drift. If, however, the value of $p_t$ is close to 0 it can mean that the predicted value 202 may come from a different distribution because this indicates that very few past residuals are as large as new residuals. Thus, the new data samples do not behave similarly to past data, which implies data may be drifting.

In aspects, and in order to determine whether the weighted p-value is randomly occurring or is part of a pattern indicating a trend/drift away from the training data, a further determination must be made to accumulate consistent evidence from the weighted p-values determined, that there is actually a broader trend/drift away from the training data. In order to do this, a martingale $S_t$ is determined for all weighed p-values up to $p_t$.

Determining $S_t$ allows the system 100 to confirm the weighted p-value is part of a pattern of persistent low weighted p-values. Persistent low weighted p-values indicate a drift away from the training data. The idea of a martingale is based on a "fair game." By way of example, assuming the "fair game" is that we flip a coin and bet money on whether it will be a head or tail, on average we should not gain nor lose money-our money stays the same. In the context of data drifting, if the new sample causes data drift, the game is no longer fair. A martingale will help detect such a drift.

In aspects, to determine $S_t$, the weighted p-value can be transmitted to a further sub-component of the AI monitoring component 110. In aspects, this further sub-component, as shown in FIG. 2, can be the martingale computation component 208. The martingale computation component 208 refers to a software and/or hardware component that can implement functionality to determine $S_t$. In aspects, the martingale computation component 208 can implement a function shown in equation (6) below, or its equivalent, to determine $S_t$:

$$S_t = \prod_{i=1}^{t} \left( \epsilon \cdot p_i^{\epsilon-1} \right) \qquad (6)$$

In equation (6), e is a tuning parameter between 0 and 1; and $p_i$ is an indexed weighted p-value corresponding to i. Again, $\epsilon$ can be chosen based on what application the system 100 is to be applied to and the AI model 108 to be monitored. The variables i and t represent the same values as in equations (3)-(5) above.

Equation (6) is a product of the weighted p-values up to the given time t. Thus, because of the factor $$\left(\epsilon \cdot p_i^{\epsilon-1}\right)$$

when $p_i$ is small, $S_t$ will grow exponentially, in-line with the premise that when $p_t$ is close to 0 it can mean that the predicted value 202 may come from a different distribution. Thus, exponential growth of $S_t$ can indicate that the predicted value 202 is diverging from the training data indicating a drift/trend away from the training data. If, however, $p_i$ is uniformly distributed between 0 and 1 (under a no-drift null hypothesis), it means there is no data drifting and the residual values are akin to white noises.

For example, assuming $\epsilon$=0.5 and the weighted p-values=0.7 several times in a row. The factor $$\left(\epsilon \cdot p_i^{\epsilon-1}\right),$$

will equal 0.06. If the weighted p-values stay high, the average of these factors over many weighted p-values will be closer to 1—like a fair game. However, in a fair game, the same values can be obtained several times in a row. In our case, a small weighted p-value (e.g., 0.01) will make this factor much larger than 1. If we get several small p-values in a row, martingale $S_t$ will grow exponentially. In a fair game, it's unlikely that we will get many small p-values in a row-so when that really happens, we know the data is drifting. For example, assume $\epsilon$=0.5. This time, assume we obtain three weighted p-values=0.01 in a row. So the martingale at this point is 5×5×5=125. Jumping from close to 1 to 125 in just 3 samples indicates that it is not a fair game anymore. Thus, by determining martingales it can be determined whether there is a change in the nature of the data.

In aspects, in order to determine whether to generate the alert 112 indicating that a sufficient drift/trend away from the training data has occurred, indicating that the AI model 108 may need to be re-trained, a tracking component 210 of the AI monitoring component 110 can monitor the growth of $S_t$ to determine whether it has grown equal to or above a threshold. Throughout this disclosure, the threshold will also be referred to using symbol $\tau$ for ease of reference.

The tracking component 210 refers to a software and/or hardware component implementing functionality to determine whether $S_t$ has grown equal to or above $\tau$. In aspects, the tracking component 208 can implement a function shown in equation (7) below, or its equivalent, to define $\tau$ as:

$$\tau = \frac{1}{\alpha} \tag{7}$$

In equation (7), $\alpha$ is a constant between 0 and 1. Again, a can be chosen based on what application the system 100 is applied to and what AI model 108 is to be monitored. If, for example, it is desired for the application and/or AI model 108 to not be sensitive to model re-training, $\alpha$ can be set closer to 0, while if the application and/or AI model 108 is to be sensitive to model re-training, a can be set closer to 1. Therefore, when $S_t \geq \tau$, the tracking component 210 can be triggered to generate the alert 112, indicating that the AI model 108 may need to be re-trained.

As indicated, the alert 112 can take the form of a visual alert to be displayed on a graphical user interface (GUI) to a user, or can take the form of a message sent as part of a messaging system to the user. For example, the alert 112 can be a graphic or a pop-up window to be displayed to the system administrator, data scientist, or other individual responsible for training the AI model 108 as part of a monitoring system for the AI model 108. The graphic or pop-up window can be displayed with further text indicating that the AI model 108 needs to be re-trained.

In aspects, if in the form of a message sent as part of a messaging system to the user, the alert 112 can be a text message, email, push notification, etc., indicating that the AI model 108 may need to be re-trained.

In other aspects, rather than sending the alert 112 to a user, the alert 112 can be sent as a signal to a further system responsible for training the AI model 108 to automatically initiate re-training of the AI model 108. For example, a computing system can be integrated with system 100 that can kick-start a model re-training process based on the alert 112. The computing system can, for example, initiate a data pull and/or a re-processing of data to train the AI model 108. The aforementioned are merely exemplary and a POSA reading this disclosure can determine how best to implement the alert 112 and the AI model 108 re-training.

In aspects, the re-training can be performed through any number of methods. For example, in aspects, a new training dataset can be formed by extracting the most recent data samples (e.g., N samples, where N is an integer) up to the time when the alert 112 is generated. When choosing the N, the person or system responsible for re-training the AI model 108 can have autonomy in determining how many data samples to choose, but must consider that a large value for N may include outdated samples, while a small value for N may not include the trending pattern. Again, the re-training and choosing of the data samples to use as the re-training data is application dependent.

In aspects, the re-training can be performed using the same methodology that was applied in the original training pipeline which was originally used to train the AI model 108. In aspects, to validate the re-training, the procedures discussed with respect to FIGS. 1 and 2 can be applied to the re-trained AI model 108. Thus, residuals, weighted p-values, and martingales stay below the threshold. In aspects, if a continued drift is observed with the re-trained AI model 108, it may indicate that N was not chosen correctly, and so it may be the case that a further re-training needs to be performed with a different value of N. Thus, the above mentioned procedure for re-training ensures that the re-training process stops once data stabilization is observed as indicated by the martingales staying below the threshold value.

The aforementioned system and method provides a novel framework to detect when the real-world data has trended/drifted away from the original training data in order to alert that the AI model may need to be re-trained.

By using the proposed framework, the system and method resolves the problem of determining when to re-train AI models at least for data provided in an online setting, for real-time data arriving continuously as a data stream. Thus, the proposed system and method can be used on a variety of AI models used to predict weather data, stock market prices, streaming data (e.g., data coming in from sensors, such as temperature sensors, healthcare vitals monitoring devices, etc.), or event-driven data (website clicks/page views, user session events, etc.), to detect when these models need to be re-trained and/or updated. A POSA reading this disclosure will recognize other applications for the disclosed system and method based on the aforementioned data and similar contexts.

By using the proposed system and method, decisions on when to re-train certain AI models can be made to be data-driven rather than subjectively made. As indicated, knowing when to re-train an AI model is critical because the amount of data and the scale of modern AI models is huge. It is not practical to constantly re-train AI models because re-training a modern AI model is both costly and time-consuming. Thus, by employing the system and method, precise timings can be obtained indicating when AI models may be due for re-training because they no longer give predictions in line with historical trends. This insight, not only provides a novel way of detecting when AI models may be out of date, but also provides significant savings in time, cost, and computing resources given that training and re-training AI models requires significant computing and financial resources.

Thus, the system and method provides an enhancement to existing systems employing AI models, because it provides a reliability mechanism for detecting when AI models may be out of date. No such system is known to exist that provides the disclosed functions. Thus, the system and method provided herein use entirely new ways of solving the problem of model re-training and improves the functioning of computers and provides an advance in AI technology.

The functions of the system 100 can be performed by one or more computing devices. These computing devices can be, for example, the computing devices of the cloud-computing environment 102. The computing devices can implement both hardware and software, which can be stored as instructions on a non-transitory computer readable medium to be executed by one or more computing units such as a processor, a special purpose computer, an integrated circuit, integrated circuit cores, or a combination thereof, to perform the functions of the system 100.

The non-transitory computer readable medium can be implemented with any number of memory units, such as a volatile memory, a nonvolatile memory, an internal memory, an external memory, or a combination thereof. The non-transitory computer readable medium can be integrated as a part of the system 100, or installed as a removable portion of the system 100.

In equations (1)-(7) above, the coefficients, variables, and parameters defined can be varied and adjusted substantially based on application and the AI model 108 to be monitored. Substantially means that the coefficient, variables, and parameters can be varied A degree of deviation that would still be considered functionally equivalent or perform the same function in substantially the same way to achieve substantially the same result, as perceived by a POSA, without materially altering equations (1)-(7).

Methods of Operation

FIG. 3 is an example method 300 of operating the system 100 according to aspects. Method 300 can be implemented on computing devices, for example the computing devices of the cloud-computing environment 102 of FIG. 1. In aspects, method 300 can be performed by the AI monitoring component 110 of FIGS. 1 and 2.

In aspects, method 300 can begin by having the AI monitoring component 110, receive, from a trained AI model 108, a predicted value $\hat{x}_t$ for an instance of time-series data occurring at a given time t within a rolling time window W, as shown in step 302.

In aspects, the AI monitoring component 110 can further receive an observed value $x_t$ for the instance, as shown in step 304.

In aspects, once $\hat{x}_t$ and $x_t$ are received, a component of the AI monitoring component 110 (e.g., the residual computation component 204) can determine a residual value $r_t$ between $\hat{x}_t$ and $x_t$, as shown in step 306.

In aspects, the residual value $r_t$ can be stored as part of an indexed set of residuals $I_t$ within W, as shown in step 308.

In aspects, and for all the residuals within $I_t$, a further component of the AI monitoring component 110 (e.g., the p-value computation component 206) can determine a weighted p-value $p_t$, as shown in step 310.

In aspects, and once $p_t$ is determined, a further component of the AI monitoring component 110 (e.g., the martingale computation component 208) can then determine a martingale $S_t$ for all weighted p-values up to $p_t$, as shown in step 312.

In aspects, once the martingale $S_t$ is determined, a further component of the AI monitoring component 110 (e.g., the tracking component 210) can monitor $S_t$ to determine when $S_t$ is greater than or equal to a threshold $\tau$, as shown in step 314.

In aspects, when $S_t$ is greater than or equal to $\tau$, the tracking component 210 can generate an alert 112 that can indicate that the trained AI model may need to be re-trained, as shown in step 316.

The operations of method 300 can be performed, for example, by system 100, in accordance with aspects described above. The functions described can be performed according to and consistent with FIGS. 1-2, by the AI monitoring component 110, its sub-components, or their equivalents as described above. In aspects, such components can be combined in various ways or manners to perform the functions described with respect to method 300.

Components of the System

Figure 4:
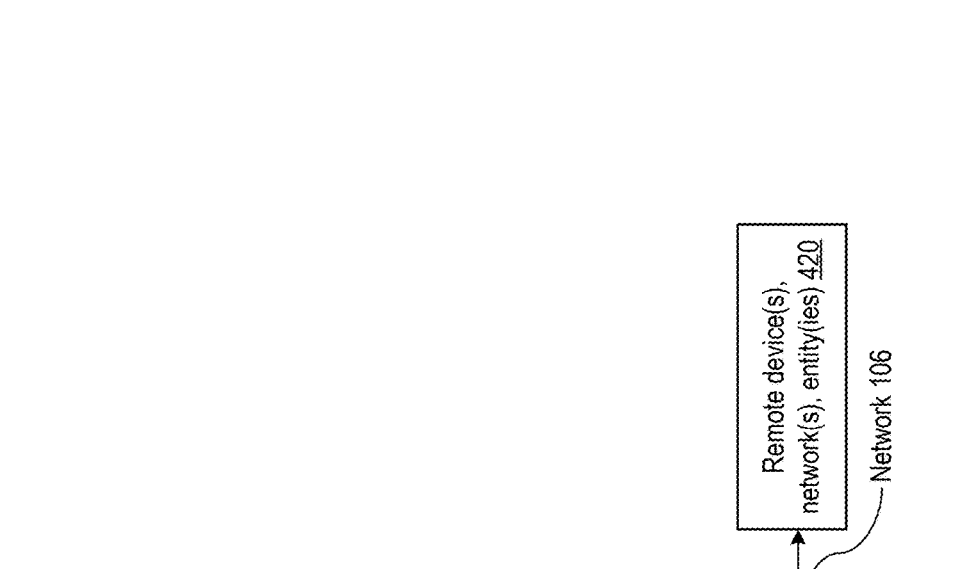
FIG. 4 is an example architecture of the components that can be used to implement the computing devices of the system according to aspects.

FIG. 4 is an example architecture 400 of the components that can be used to implement the computing devices of the system 100 according to aspects. The components can be implemented on any of the devices of the system 100, for example the computing devices of the cloud-computing environment 102. In aspects, the components may include a control unit 402, a storage unit 406, a communication unit 416, and a user interface 412. The control unit 402 may include a control interface 404. The control unit 402 may execute software 410 to provide some or all of the intelligence of system 100. The control unit 402 can be implemented in a number of different ways. For example, the control unit 402 can be a processor (e.g., central processing unit (CPU) or a graphics processing unit (GPU)), an application specific integrated circuit (ASIC), an embedded processor, a microprocessor, a hardware control logic, a hardware finite state machine (FSM), a digital signal processor (DSP), a field programmable gate array (FPGA), a quantum computer, or a combination thereof.

The control interface 404 can be used for communication between the control unit 402 and other functional units or devices of system 100. The control interface 404 may also be used for communication that is external to the functional units or devices of system 100. The control interface 404 may receive information from the functional units or devices of system 100, or from remote devices 420, or may transmit information to the functional units or devices of system 100, or to remote devices 420. The remote devices 420 refer to devices external to system 100, such as any interfaces or computers used to provide, for example, the predicted value 202 or the observed value 104 into the system 100.

The control interface 404 can be implemented in different ways and may include different implementations depending on which functional units or devices of system 100 or remote devices 420 are being interfaced with the control unit 402. For example, the control interface 404 can be implemented with integrated circuits, optical circuitry, waveguides, wireless circuitry, wireline circuitry to attach to a bus, an application programming interface (API), or a combination thereof. The control interface 404 can be connected to a communication infrastructure 422, such as a bus, to interface with the functional units or devices of system 100 or remote devices 420.

The storage unit 406 may store the software 410. For illustrative purposes, the storage unit 406 is shown as a single element, although it is understood that the storage unit 406 can be a distribution of storage elements. Also for illustrative purposes, the storage unit 406 is shown as a single hierarchy storage system, although it is understood that the storage unit 406 can be in a different configuration. For example, the storage unit 406 can be formed with different storage technologies forming a memory hierarchical system including different levels of caching, main memory, rotating media, or off-line storage. The storage unit 406 can be a volatile memory, a nonvolatile memory, an internal memory, an external memory, or a combination thereof. For example, the storage unit 406 can be a nonvolatile storage such as nonvolatile random access memory (NVRAM), Flash memory, disk storage, or a volatile storage such as static random access memory (SRAM) or dynamic random access memory (DRAM).

The storage unit 406 may include a storage interface 408. The storage interface 408 can be used for communication between the storage unit 406 and other functional units or devices of system 100. The storage interface 408 may also be used for communication that is external to system 100. The storage interface 408 may receive information from the other functional units or devices of system 100 or from remote devices 420, or may transmit information to the other functional units or devices of system 100 or to remote devices 420. The storage interface 408 may include different implementations depending on which functional units or devices of system 100 or remote devices 420 are being interfaced with the storage unit 406. The storage interface 408 can be implemented with technologies and techniques similar to the implementation of the control interface 404.

The communication unit 416 may enable communication to devices, components, or units of system 100 or to remote devices 420. For example, the communication unit 416 may permit the system 100 to communicate between the devices of the cloud-computing environment 102. The communication unit 416 may further permit the devices of system 100 to communicate with remote devices 420 such as an attachment, a peripheral device, or a combination thereof, through the network 106, or to data sources, for example, those providing the predicted value 202 or the observed value 104 into the system 100.

As previously indicated, the network 106 may span and represent a variety of networks and network topologies. For example, the network 106 may include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that can be included in the network 106. Cable, Ethernet, digital subscriber line (DSL), fiber optic lines, fiber to the home (FTTH), and plain old telephone service (POTS) are examples of wired communication that can be included in the network 106. Further, the network 106 may traverse a number of network topologies and distances. For example, the network 106 may include direct connection, personal area network (PAN), local area network (LAN), metropolitan area network (MAN), wide area network (WAN), or a combination thereof.

The communication unit 416 may also function as a communication hub allowing system 100 to function as part of the network 106 and not be limited to be an end point or terminal unit to the network 106. The communication unit 416 may include active and passive components, such as microelectronics, communications circuitry, Radio Frequency (RF) circuitry, or an antenna, for interaction with the network 106.

The communication unit 416 may include a communication interface 418. The communication interface 418 can be used for communication between the communication unit 416 and other functional units or devices of system 100 or to remote devices 420. The communication interface 418 may receive information from the other functional units or devices of system 100, or from remote devices 420, or may transmit information to the other functional units or devices of the system 100 or to remote devices 420. The communication interface 418 may include different implementations depending on which functional units or devices are being interfaced with the communication unit 416. The communication interface 418 can be implemented with technologies and techniques similar to the implementation of the control interface 404.

The user interface 412 may present information generated by system 100. In aspects, the user interface 412 allows a user to interface with the devices of system 100 or remote devices 420. The user interface 412 may include an input device and an output device. Examples of the input device of the user interface 412 may include a keypad, buttons, switches, touchpads, soft-keys, a keyboard, a mouse, or any combination thereof to provide data and communication inputs. Examples of the output device may include a display interface 414. The control unit 402 may operate the user interface 412 to present information generated by system 100, for example, the alert 112. The control unit 402 may also execute the software 410 to present information generated by system 100, or to control other functional units of system 100. The display interface 414 can be any graphical user interface such as a display, a projector, a video screen, or any combination thereof.

The above detailed description and aspects of the disclosed system 100 are not intended to be exhaustive or to limit the disclosed system 100 to the precise form disclosed above. While specific examples for system 100 are described above for illustrative purposes, various equivalent modifications are possible within the scope of the disclosed system 100, as a POSA will recognize. For example, while processes and methods are presented in a given order, alternative implementations may perform routines having steps, or employ systems having processes or methods, in a different order, and some processes or methods can be deleted, moved, added, subdivided, combined, or modified to provide alternative or sub-combinations. Each of these processes or methods can be implemented in a variety of different ways. Also, while processes or methods are at times shown as being performed in series, these processes or blocks may instead be performed or implemented in parallel, or can be performed at different times.

The resulting method 300 and system 100 is cost-effective, highly versatile, and accurate, and can be implemented by adapting components for ready, efficient, and economical manufacturing, application, and utilization. Another important aspect of the present disclosure is that it valuably supports and services the historical trend of reducing costs, simplifying systems, and/or increasing performance.

These and other valuable aspects of the present disclosure consequently further the state of the technology to at least the next level. While the disclosed aspects have been described as the best mode of implementing system 100, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense. Accordingly, the scope of the disclosure should be determined not by the aspects illustrated, but by the appended claims and their equivalents.

What is claimed is:

1. A computer-implemented method for monitoring a status of a trained artificial intelligence (AI) model comprising:

for an instance of time-series data occurring at a given time t within a rolling time window W of fixed duration:

receiving, by one or more computing devices and from the trained AI model, a predicted value $\hat{x}_t$ for the instance;

receiving, by the one or more computing devices, an observed value $x_t$ for the instance;

determining, by the one or more computing devices, a residual value $r_t$ between $\hat{x}_t$ and $x_t$;

storing, by the one or more computing devices, $r_t$ as part of an indexed set of residuals $I_t$ within W;

determining, by the one or more computing devices, a weighted p-value $p_t$ for residuals in $I_t$, wherein each weight assigned for the residuals dampens with time within W;

determining, by the one or more computing devices, a martingale $S_t$ for all weighted p-values up to $p_t$;

monitoring, by the one or more computing devices, $S_t$ to determine when $S_t$ is greater than or equal to a threshold $\tau$;

generating, by the one or more computing devices, an alert when $S_t$ is greater than or equal to $\tau$, wherein the alert indicates that the trained AI model needs to be re-trained; and re-training, by the one or more computing devices, the AI model based on generating the alert.

2. The computer-implemented method of claim 1, further comprising determining, by the one or more computing devices, $r_t$ according to:

$$r_t = |x_t - \hat{x}_t|.$$

3. The computer-implemented method of claim 1, further comprising determining, by the one or more computing devices, $p_t$ according to:

16

$$p_t = \frac{1}{Z_t} \sum_{i \in I_t} w_{t,i} * 1\{r_i \geq r_t\},$$

wherein, $Z_t$ is a normalization constant, i is an index value for each residual value of the indexed set of residuals, $w_{t,i}$ is a weight assigned to each residual value corresponding to i at t, $r_i$ is a residual value corresponding to i, and $1\{r_i \geq r_t\}$ is an indicator function that equals 1 if $r_i \geq r_t$, and 0 otherwise.

4. The computer-implemented method of claim 3, further comprising determining, by the one or more computing devices, $Z_t$ according to:

$$Z_t = \Sigma_{i \in I_t} w_{t,i}.$$

5. The computer-implemented method of claim 3, further comprising determining, by the one or more computing devices, $w_{t,i}$ according to:

$$w_{t,i} = \lambda^{t-1-i},$$

wherein, $\lambda$ is a constant between 0 and 1.

6. The computer-implemented method of claim 1, further comprising determining, by the one or more computing devices, $S_t$ according to:

$$S_t = \prod_{i=1}^{t}\left(\epsilon \cdot p_i^{\epsilon - 1}\right),$$

wherein, $\epsilon$ is a tuning parameter between 0 and 1, and $p_i$ is an indexed weighted p-value corresponding to i.

7. The computer-implemented method of claim 1, further comprising determining, by the one or more computing devices, $I_t$ according to:

$$I_t = \{i: \max(1, t-W) \leq i \leq t-1\}.$$

8. The computer-implemented method of claim 1, further comprising determining, by the one or more computing devices, $\tau$ according to:

$$\tau = \frac{1}{\alpha},$$

wherein, $\alpha$ is a constant between 0 and 1.

9. The computer-implemented method of claim 1, wherein the alert is:

a visual alert displayed on a graphical user interface (GUI) to a user; or a message sent as part of a messaging system to the user.

10. A non-transitory computer readable medium with instructions stored thereon for monitoring a status of a trained artificial intelligence (AI) model, that when executed by one or more processors of a computing system, causes the computing system to perform operations comprising:

for an instance of time-series data occurring at a given time t within a rolling time window W of fixed duration:

receiving, from the trained AI model, a predicted value $\hat{x}_t$ for the instance;

receiving an observed value $x_t$ for the instance;

determining a residual value $r_t$ between $\hat{x}_t$ and $x_t$;

storing $r_t$ as part of an indexed set of residuals $I_t$ within W;

determining a weighted p-value $p_t$ for residuals in $I_t$, wherein each weight assigned for the residuals dampens with time within W;

determining a martingale $S_t$ for all weighted p-values up to $p_t$;

monitoring $S_t$ to determine when $S_t$ is greater than or equal to a threshold $\tau$;

generating an alert when $S_t$ is greater than or equal to $\tau$, wherein the alert indicates that the trained AI model needs to be re-trained; and re-training the AI model based on generating the alert.

11. The non-transitory computer readable medium of claim 10, wherein the operations further comprise determining $r_t$ according to:

$$r_t = |x_t - \hat{x}_t|.$$

12. The non-transitory computer readable medium of claim 10, wherein the operations further comprise determining $p_t$ according to:

$$p_t = \frac{1}{Z_t} \sum_{i \in I_t} w_{t,i} * 1\{r_i \geq r_t\},$$

wherein, $Z_t$ is a normalization constant, $i$ is an index value for each residual value of the indexed set of residuals, $w_{t,i}$ is a weight assigned to each residual value corresponding to $i$ at $t$, $r_i$ is a residual value corresponding to $i$, and $1\{r_i \geq r_t\}$ is an indicator function that equals 1 if $r_i \geq r_t$, and 0 otherwise.

13. The non-transitory computer readable medium of claim 12, wherein the operations further comprise determining $Z_t$ according to:

$$Z_t = \Sigma_{i \in I_t} w_{t,i}.$$

14. The non-transitory computer readable medium of claim 12, wherein the operations further comprise determining $w_{t,i}$ according to:

$$w_{t,i} = \lambda^{t-1-i},$$

wherein, $\lambda$ is a constant between 0 and 1.

15. The non-transitory computer readable medium of claim 10, wherein the operations further comprise determining $S_t$ according to:

according to:

$$S_t = \prod_{i=1}^{t} \left( \epsilon \cdot p_i^{\epsilon-1} \right),$$

wherein, $\epsilon$ is a tuning parameter between 0 and 1, and $p_i$ is an indexed weighted p-value corresponding to i.

16. The non-transitory computer readable medium of claim 10, wherein the operations further comprise determining $I_t$ according to:

$$I_t = \{i : \max(1, t-W) \leq i \leq t-1\}.$$

17. The non-transitory computer readable medium of claim 10, wherein the operations further comprise determining $\tau$ according to:

$$\tau = \frac{1}{\alpha},$$

wherein, $\alpha$ is a constant between 0 and 1.

18. The non-transitory computer readable medium of claim 10, wherein the alert is:

a visual alert displayed on a graphical user interface (GUI) to a user; or a message sent as part of a messaging system to the user.

19. A computing system for monitoring a status of a trained artificial intelligence (AI) model comprising:

a memory configured to store instructions;

one or more processors, coupled to the memory and configured to process the stored instructions to perform operations comprising:

for an instance of time-series data occurring at a given time t within a rolling time window W of fixed duration:

receive, from the trained AI model, a predicted value $\hat{x}_t$ for the instance;

receive an observed value $x_t$ for the instance;

determine a residual value $r_t$ between $\hat{x}_t$ and $x_t$;

store $r_t$ as part of an indexed set of residuals $I_t$ within W;

determine a weighted p-value $p_t$ for residuals in $I_t$, wherein each weight assigned for the residuals dampens with time within W;

determine a martingale $S_t$ for all weighted p-values up to $p_t$;

monitor $S_t$ to determine when $S_t$ is greater than or equal to a threshold $\tau$;

generate an alert when $S_t$ is greater than or equal to $\tau$, wherein the alert indicates that the trained AI model needs to be re-trained; and re-train the AI model based on generating the alert.

20. The computing system of claim 19, wherein the alert is:

a visual alert displayed on a graphical user interface (GUI) to a user; or a message sent as part of a messaging system to the user.

\* \* \* \* \*